United States Patent [19]

Izawa et al.

[11] Patent Number: 4,881,214

[45] Date of Patent: Nov. 14, 1989

[54] DATA RECORD FORMATTING SYSTEM AND READING/WRITING SYSTEM FOR OPTICAL RECORDING MEDIUM

[75] Inventors: Shigeru Izawa; Takashi Hasemi, both of Tokyo, Japan

[73] Assignee: CSK Corporation, Tokyo, Japan

[21] Appl. No.: 48,573

[22] Filed: May 11, 1987

[30] Foreign Application Priority Data

May 12, 1986 [JP] Japan ............................. 61-108155
May 17, 1986 [JP] Japan ............................. 61-113870
Jul. 8, 1986 [JP] Japan ............................. 61-160444

[51] Int. Cl.$^4$ ..................... G11B 7/013; G11B 21/10
[52] U.S. Cl. ..................................... 369/44; 369/275
[58] Field of Search ................. 369/44, 45, 46, 275; 360/2

[56] References Cited

U.S. PATENT DOCUMENTS

| | | | |
|---|---|---|---|
| 3,624,284 | 11/1971 | Russell | 369/44 |
| 3,885,094 | 5/1975 | Russell | 369/44 |
| 4,363,116 | 12/1982 | Kleuters et al. | 369/44 |
| 4,443,870 | 4/1984 | Hazel et al. | 369/275 |
| 4,462,095 | 7/1984 | Chen | 369/44 |
| 4,553,228 | 11/1985 | Gerard et al. | 369/46 |
| 4,577,301 | 3/1986 | Mathews et al. | 369/44 |
| 4,598,393 | 7/1986 | Pierce et al. | 369/46 |
| 4,674,070 | 6/1987 | Tajima et al. | 369/109 |
| 4,761,772 | 8/1988 | Murakami | 369/275 |
| 4,761,775 | 8/1988 | Murakami | 369/275 |

FOREIGN PATENT DOCUMENTS

096969 12/1983 European Pat. Off.
2569038 7/1986 France.

OTHER PUBLICATIONS

Arter, Call and Devore, "Optical Recording Format", Technical Disclosure Bulletin, vol. 26, 7B (Dec. 1983): 3956-3957.

Primary Examiner—Donald McElheny, Jr.
Attorney, Agent, or Firm—Lowe, Price, LeBlanc, Becker & Shur

[57] ABSTRACT

A data record formatting system for an optical recording medium in which the reading and/or writing is carried out along tracking lines, and a data reading/writing system for the optical recording medium of the type is disclosed. The data record formatting system for the optical recording medium comprises tracking portions used as a reference for the reading and/or writing operation and data recording portions for storing data. The tracking portion and the data recording portions are alternately arranged along the same line in a data recording region of the optical recording medium. The data reading/writing system for the optical recording medium comprises a track-tracing detecting arrangement for setting a light spot or spots on the optical recording medium to trace the tracking portions and a reading/writing arrangement for setting a light spot on the optical recording medium to read and/or write the data. The track-tracing detecting arrangement and the reading/writing arrangement are arranged so that the light spots set on the optical recording medium are disposed on and along the line in which the tracking portions and the data recording portions are alternately arranged.

12 Claims, 7 Drawing Sheets

DATA RECORD FORMATTING SYSTEM AND READING/WRITING SYSTEM FOR OPTICAL RECORDING MEDIUM

FIELD OF THE INVENTION

This invention relates to a data record formatting system for an optical recording medium of a type in which data reading/writing is carried out along a tracking line, and a reading/writing system for such a data record formatting system.

BACKGROUND OF THE INVENTION

There have been known various systems of formatting data record for an optical recording medium. Among these systems is, for example, a system as shown in FIG. 15 which is suited for a recording medium of a card type.

In the system as illustrated in FIG. 15, tracking lines 1 are provided on a data recording region and clock bits 2 and a data track 3 are disposed, at predetermined intervals, along the lines 1. These are arranged in three lines and these three lines are further juxtaposed so that a plurality of data tracks may be provided in the data recording region.

In this data record formatting system, the reading/writing of data is carried out in a manner as illustrated in FIG. 15 in which a reading/writing head produces light beams B1, B2 and B3 so as to correspond to the juxtaposed three lines. One of the light beams is used for tracing the tracking line, another is used for detecting the clock bits and the rest is used for reading, writing and focussing.

However, the data record formatting system as described above involves the following problems:

Since this record formatting system has such a configuration that the three lines comprising the tracking line 1, the clock bit line 2 and the data track 3 are juxtaposed in the data recording region, the data track should be provided for every three lines. This reduces the recording density. Moreover, since the data reading/writing should be carried out while tracing the three lines juxtaposedly and conjointly, the intervals between the lines should be large enough, e.g. 10 μm or more, so as to improve the accuracy of data reading/writing. This is especially crucial in the case of a card type recording medium, which has a relatively small data recording region, because the increased intervals between the lines lower the data recording capacity.

SUMMARY OF THE INVENTION

The present invention has been made to obviate the problems as described above, and it is an object of the present invention to provide a data record formatting system for an optical recording medium in which the number of lines, which are not used directly for data recording is reduced, allowing the tracking in the data reading or writing to be carried out only to the lines on which data are recorded. This will improve the recording density together with the recording capacity.

It is another object of the present invention to provide a data reading/writing system suitable for the data record formatting system as just described.

The present invention features a data record formatting system for an optical recording medium of a type in which the data reading or writing is carried out along tracking lines, which system comprises a tracking means or portion functioning as a reference for the tracking in the reading and the writing operation and a data recording means or portion for storing the data, said tracking portion and the data recording portion being alternately provided in the data recording region and disposed in the same line.

The tracking portion is formed by an optical patterns having a shape such as a square, rectangle, etc. However, the patterns are not limited to these shapes.

If the tracking portions are provided periodically, they may function as clock bits.

Data is written in the data recording portion by forming optically changed states thereon. The number of the optically changed states to be formed in each of the data recording portion is not limited so far as the reading/writing can be effected. However, one or two are suitable to simplify the configuration of an optical system for the reading and writing and the formation of an appended circuitry associated with the optical system.

The data recording formatting system for the optical recording medium according to the present invention has a data/tracking line, which is a data line as well as a tracking line, formed by alternately providing the tracking portions and the data recording portions on the same line. A plurality of these data/tracking lines are arranged side by side, for example, on a substrate of a card type for forming an optical recording medium. If the tracking portions are disposed periodically to function as clock bits, a data/tracking/clock bit line is formed.

The present invention further features a data reading and/or writing system adapted for the data record formatting system of the optical recording medium as described above, which data reading or writing system is characterized in that a plurality of light spots for setting optically operative domains or orbits on the optical recording medium for effecting the tracing of the tracking portions and the reading and writing of data are arranged so that they may be disposed on and along the track or line in which the tracking portions and the data recording portions are alternately arranged.

The present invention further features a data reading and/or writing system in which the plurality of light spots are spaced from each other by a distance which is so selected that whole or part of any of the light spots may always be on any or some of the tracking portions throughout the movement of the light spots so long as they are on the track.

In the data reading and/or writing system, the track-tracing detecting means and the reading and/or writing means each have at least one light spot projected on the optical recording medium. In this case, the corresponding relationship between the respective means and the light spots may be fixed or variable.

In a preferred embodiment, the track-tracing detecting means is so formed that the light spots projected on the optical recording medium may be set at at least two positions corresponding to the tracking portions. In this case, the reading and/or writing light spot is disposed in the same line of the two light spots of the track-tracing detecting means. Preferably, the reading/writing light spot is interposed between the light spots of the track-tracing detecting means.

The light spot as mentioned above represents an optically operative region on the optical recording medium and it means an image of a light beam formed on the optical recording medium when the light beam is used to irradiate the optical recording medium. The writing means has its writing range defined by the image of the light beam and writes data by the action of the light beam. The track-tracing detecting means and the reading means obtain necessary information by observing the images with their detectors.

More specifically, with respect to the track-tracing detecting means and the reading means, the optically operative region is determined by the light spot and the view field of the detector which observes the light spot. Therefore, it is not essential in the track-tracing detecting means and the reading means to irradiate the optical recording medium by using the light beam. More particularly, for example, a background light may be utilized for detecting the pattern. In this case, the view field on the optical recording medium of the detector is virtually set as a light spot instead of the image of the light beam.

The data reading and/or writing system for the optical recording medium according to the present invention includes three modes, namely, a data reading system, a data writing system and a data reading and writing system for the optical recording medium.

In the data reading and/or writing system of the present invention, the light spots as mentioned above are arranged in a line. A preferred number of the light spots is three. In this case, the outer two may be used mainly for the tracking and the central one may be used mainly for the reading/writing. One of the two outer light spots may be used further as a monitoring means for checking a possible writing and/or reading error. Any of the light spots may be used for detection of clock signals provided based on the periodic arrangement of the tracking portions.

OPERATION

According to the data record formatting system of the present invention, the tracking portions functioning as a reference for the tracking and the data recording portions for recording data are arranged alternatingly in the same line, so that the number of lines directly involved in the data recording can be one. This can advantageously omit surplus lines for the data recording, minimizing the number of the lines required for the data recording.

Moreover, since the tracking line is on the same line as the data recording portion for storing the data, it will suffice for preventing possible tracking error in the data reading and/or writing operation to trace only the line on which the data recording portions for storing the data are together with the tracking portions. Furthermore, this line can be set irrespective of the positions of the adjacent lines, which is a characteristic feature of the present invention, so that the data/tracking lines comprising the data recording portions and the tracking portions can be arranged side by side at smaller intervals without affecting the reading/writing of the data. Thus, the data recording capacity of the data recording region of a restricted area can be largely increased.

Furthermore, since the tracking portions and the data recording portions are disposed periodically, in sequence, synchronizing clocks can be set utilizing the disposition. Also, in this case, the tracking and the synchronizing clock can be set in the data reading/writing operation, irrespective of the positions of the adjacent lines.

The data/tracking lines comprising the data recording portions and the tracking portions can be arranged side by side at smaller intervals without affecting the reading/writing of the data. Thus, the data recording capacity of the data recording region of a restricted area can be increased.

DESCRIPTION OF PREFERRED EMBODIMENT

First Embodiment

Figure 1:
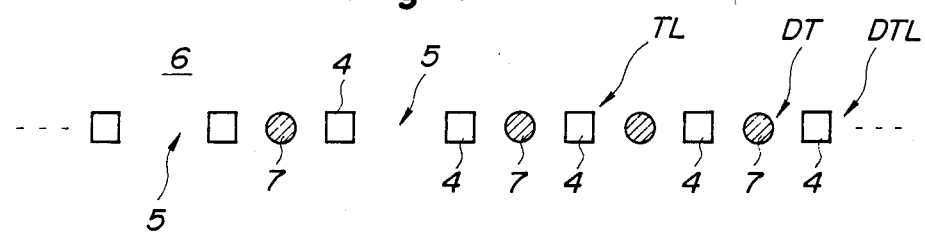
FIG. 1 is an explanatory view of one form of the data record formatting system embodying the present invention.

FIG. 1 illustrates a configuration of a first embodiment of the data record formatting system according to the present invention.

In accordance with the data record formatting system of the first embodiment as illustrated in FIG. 1, tracking portions 4 and data recording portions 5 are provided alternatingly on a line in a data recording region 6 of an optical recording medium to form a data/tracking line DTL.

The tracking portions 4 are formed, for example, to have high reflectivity so that they may be clearly distinguishable from the remaining ground portions. The configuration of the tracking portion is formed is a square in the embodiment as illustrated, but it is not limited to such a shape and may, alternatively, be formed in a rectangle. The tracking portions 4 of a square shape are arranged in a line with the data recording portions 5 interposed between the tracking portions 4 to form a tracking line TL of an intermittent or broken line. Although the tracking portions 4 of the same shape are disposed at the same intervals, the configuration of the tracking line TL is not limited to this.

The data recording portions 5 are formed at blank portions defined between the tracking portions 4. The length of each of the data recording portions 5, which is defined between the tracking portions 4 may suitably be selected according to the amount of data to be written and the type of the code pattern, etc. In the embodiment as illustrated in FIG. 1, data representing one-bit information is written in one data recording portion 5. Of course, the data recording portion 5 may store data representative of plural-bit information, if desired.

In other words, the data recording portions 5 are arranged in a line with the tracking portions 4 interposed therebetween to form a data track DT of an intermittent or broken line. The data track DT and the tracking line TL are on the same line and they form the data/tracking line DTL as described above.

The writing of data is effected, for example, by irradiating a laser beam onto the data recording portion 5 in which the data to be written, causing local melting or darkening at the irradiated portion to provide an optically changed state.

In the most simple data writing format, one optically changed state 7 is provided in one data recording portion 5 as illustrated in FIG. 1. In this case, the mode in which the optically changed state 7 is formed (shaded in the figure) indicates, for example, "1" and the mode in which no optically changed state 7 is formed indicates "0". Alternatively, a plurality of optically changed states 7 may be provided in one data recording portion 5. In this case, two different modes determined by the number of the optically changed states 7 formed in one data recording portion 5 are set to indicate "1" or "0".

With the data record formatting system as described above, both the tracking and data reading/writing can be carried out by a single line comprising the tracking portions 4 and the data recording portions 5. Simultaneously, the detection of the clock signals can also be effected, due to the periodic arrangement of the tracking portions 4 in which the tracking portions 4 are arranged at predetermined pitches.

Figure 17:
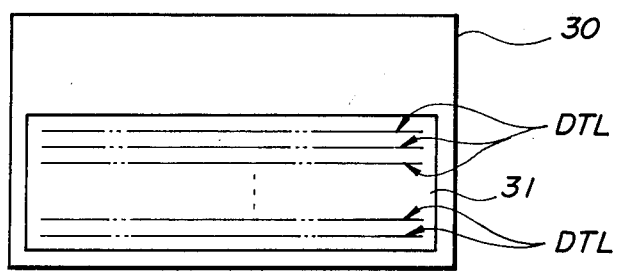
FIG. 17 is a plan view of an appearance of a card type recording medium to which the present invention is applied.

In the practical form of the recording medium, a number of the data/tracking lines are arranged side by side in a non-rotational recording medium such as a card-type recording medium, and a data/tracking line or data/tracking lines may be arranged spirally or concentrically in a rotational recording medium. These recording media can provide high-density, large-capacity recording media. FIG. 17 illustrates an example of the card-type recording medium.

In the example as shown in FIG. 17, a number of data/tracking lines DTL are provided side by side in the data recording region on the card-type recording medium 31.

The data recording/writing system adapted for the data record formatting system according to the present invention will now be described.

Figure 2:
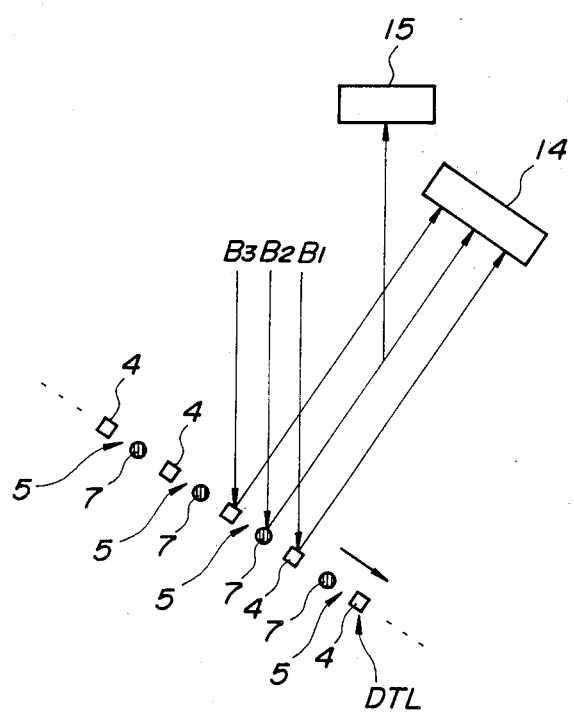
FIG. 2 is an explanatory view showing a light beam arrangement for the reading/writing operation for the data record formatting system.

For the data record formatting system of the present invention, three beams are used as illustrated in FIG. 2. The three beams comprise light beams B1 and B3 which are mainly used for the tracking and a light beam B2 which is mainly used for the reading/writing of data. These light beams B1, B2 and B3 are arranged along the length of the data/tracking line DTL and relatively moved in the longitudinal direction of the line according to the proceeding of the data recording/writing with reference to the recording medium.

Figure 4:
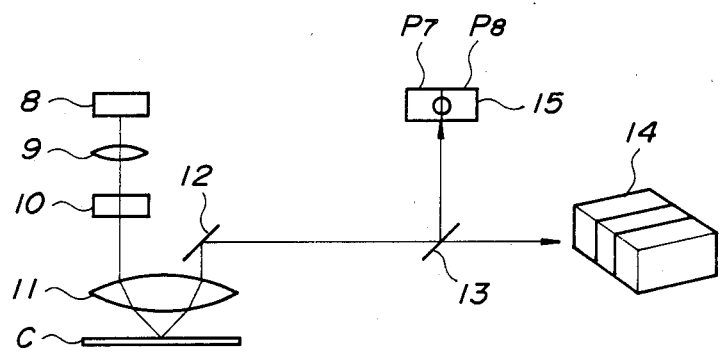
FIG. 4 is an optical path diagram of one configuration of a data reading/writing optical system for use in the above embodiment.
Figure 6:
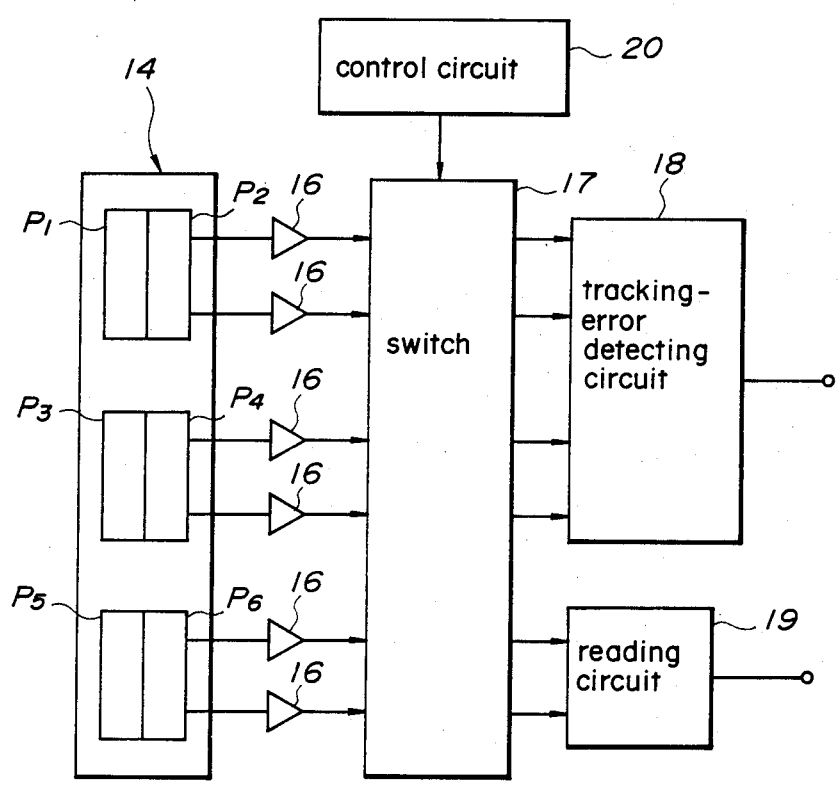
FIG. 6 is a block diagram of one configuration of an appended circuit for use in the embodiment as mentioned.

The formation of the light beams B1, B2 and B3 and the detection of the reflected light from the optical recording medium may be carried out in various methods. For example, the light beam formation and the reflected light detection can be carried out, for example, by an optical system and a circuit associated therewith as illustrated in FIGS. 4 and 6. This optical system may also be employed in another embodiment as will be described later.

In the tracking operation using such an optical system, the light beams B1 and B3 are used for irradiating the tracking portions 4 and the reflected light therefrom is received by a tracking/data reading detector 14 to determine whether the tracking is proper or not. In the embodiment as illustrated, two beams at opposite ends are used for tracking so that possible relative skew or rotation of a line formed by the light beams B1, B2 and B3 with respect to the data/tracking line DTL can be easily detected easily.

For the reading of the written data, the light beam B2 is used. In this case, a portion of the reflected light of the light beam B2 is split and transmitted to a focussing detector 15 for detecting a possible focussing error and for adjusting an objective lens 11 (FIG. 4) by a drive mechanism (not shown) based on a deviation signal to effect the focussing. The positioning for the reading may be effected simultaneously with the tracking-error detection.

In this connection, it is to be noted that the light beam B3 may be used in combination with the light beam B2, so that the obtained data may be collated with each other for detecting a possible reading error.

On the other hand, the data writing is carried out by using the light beam B2 and the increasing the intensity of the light beam. In this case, a portion of the reflected light of the light beam B2 is split and transmitted to a focussing detector 15 for detecting a possible focussing error and for adjusting objective lens 11 (FIG. 4) by a drive mechanism (not shown) based on a deviation signal to effect the focussing. The positioning for the writing may be effected simultaneously with the tracking-error detection.

Also, in this case, the light beam B3 may be used in combination with the light beam B2, so that the obtained data may be collated with each other for detecting a possible reading error.

Thus, according to the data record formatting system of the present invention, the data track and the tracking line may be combined into a line. Furthermore, it will advantageously suffice to trace only the line for carrying out the reading/writing. Thus, there is no need to consider the relationship with adjacent lines.

These light beams B1, B2 and B3 are moved along the line of the tracking portions 4 while irradiating the same, so that the reflected lights of the light beams B1, B2 and B3 contain synchronizing signals obtained based on the periodic arrangement of the tracking portions 4. Thus, the reflected light of any one of the light beams B1, B2 and B3 may be utilized to obtain clock signals.

Second Embodiment .

FIGS. 3 to 6 illustrate a second embodiment of the present invention for data reading/writing.

Figure 3:
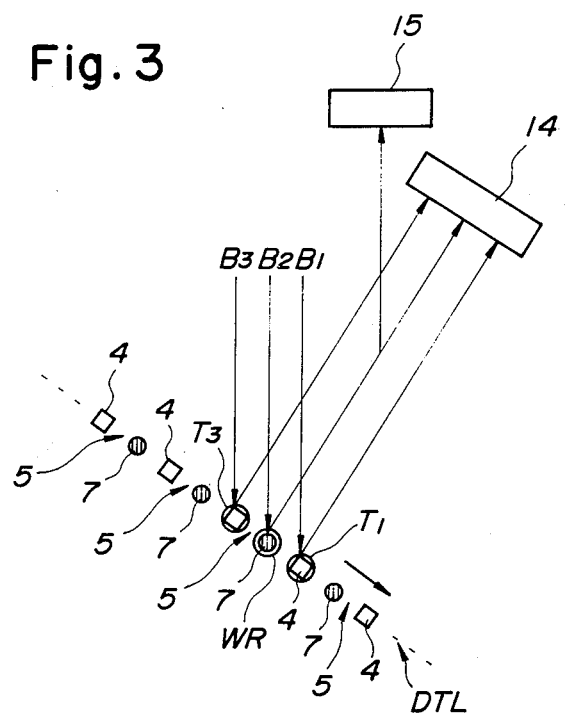
FIG. 3 is an explanatory view showing a light beam arrangement for the reading/writing for the data reading/writing system embodying the present invention.

In the data reading/writing system according to the present invention, the light beams B1 and B3 are used mainly for tracking and the light beam B2 is used mainly for data reading/writing and focussing as in the first embodiment as described above. The light beam or beams used for tracking (beams B1 and B3 in the embodiment as illustrated) irradiate the data/tracking line DTL as shown in FIG. 3 to form light spots as track detecting means (hereinafter, referred to as "track detecting spots") T1, T3. Similarly, the light beam used for the reading/writing and the focussing (beam B2 in the present embodiment) forms a light spot as a reading/writing means (hereinafter referred to as "reading/writing spot") WR.

Figure 5:
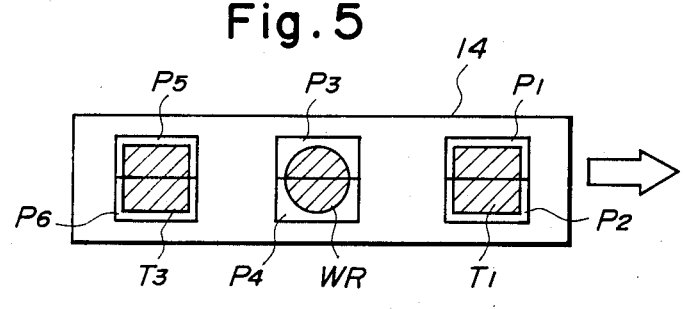
FIG. 5 is an explanatory view of one form of a photodetector array.

The formations of the light beams B1, B2 and B3 and the detection of the reflected light from the optical recording medium are carried out through the optical system and the circuit associated therewith as illustrated in FIGS. 4 to 6.

This optical system comprises a laser diode 8 for generating a light beam, a collimating lens 9, a grating 10 for splitting a beam into three beams, an objective lens 11, an optical recording medium C, beam splitters 12 and 13, a tracking/data reading detector 14 and a focussing detector 15. The appended circuit includes amplifiers 16, a switch circuit 17, a tracking-error detecting circuit 18, a reading circuit 19 and a control circuit 20.

The tracking/data reading detector 14 and the focussing detector 15 function as a track-tracing sensor, a reading sensor and a focussing sensor upon receipt of the light beams taken out by the beam splitters 12 and 13.

The tracking/data reading detector 14 comprises a semiconductor photodetector such as a PIN photodiode etc. In the present embodiment, a plurality of photodetectors P1 to P6 are arranged as illustrated in FIG. 5. A pair of the photodetectors P1 and P2 and a pair of the photodetectors P5 and P6 are used mainly for tracing the track and a pair of the photodetectors P3 and P4 is used mainly for reading.

Outputs from the photodetectors P1 and P6 are connected in pairs to the switch circuit 17 through the respective amplifiers 16 as illustrated in FIG. 6. The switch circuit 17 is connected, on the output side thereof, to the tracking-error detecting circuit 18 and the reading circuit 19. In response to an instruction signal from the control circuit 20, the outputs of the respective pairs of the photodetectors P1 to P6 are connected to the tracking-error detecting circuit 18 and the reading circuit 19.

The focussing detector 15 comprises semiconductor photodetectors such as PIN photodiodes as of the tracking/data reading detector 14. In the present embodiment, the focussing detector 15 is formed of two photodetectors P7 and P8 arranged as illustrated in FIG. 4.

The reading/writing spot WR and the track detecting spots T1, T3 are formed from the corresponding light beam B2 and light beams B1, B3, respectively, after having been condensed by the objective lens 11, and are disposed on and along the length of the data/tracking line DTL and relatively moved in the longitudinal direction thereof according to the proceeding of the data reading/writing operation.

The tracking-error detecting circuit 18 includes a calculating circuit (not shown) for obtaining differences in photo-electric outputs with respect to the pairs of the photodetectors P1 and P2 and the photodetectors P5 and P6. More particularly, the calculating circuit calculates a difference between the photoelectric output from the photodetector P1 and the photoelectric output from the photodetector P5 and a difference between the photoelectric output from the photodetector P2 and the photoelectric output from the photodetector P6 to detect a tracking error.

The optical system as mentioned above may be used in common for the reading and writing operations. In this case, the output energy of the light source 8 is increase for the writing operation so that a light beam spot of a high energy may be irradiated on the data recording region to locally melt or darken the irradiated portion, changing the optical characteristics, for example, reflectivity etc. of the irradiated portion. Thus, data is written on the recording medium. The data is converted into digital information and stored in the form of presence or absence of the optically changed states 7. On the other hand, the energy of the light beam irradiated on the data recording region is reduced for the reading operation so that the irradiated portion may not be optically changed.

The operation of the present embodiment will now be described with reference to the data reading operation, referring to the figures. However, it is to be noted that the tracking operation itself is identical in the reading operation.

In the optical system, light from the light source, laser diode 8, is split to three beams through the collimating lens 9 and the grating 10 and the resulting three beams are irradiated onto the optical recording medium C through the beam splitter 12 and the objective lens 11, respectively. The light reflected from the optical recording medium C returns to the beam splitter 12 through the objective lens 11 and is emitted externally.

The emitted light is partly reflected by the beam splitter 13 and is incident upon the focussing detector 15, but most of the emitted light enters the tracking/data reading detector 14. At this time, the three light beams provide the track detecting spots T1 and T3 and the reading/writing spot WR and form images of the irradiated portions on the tracking/data reading detector 14 as illustrated in FIG. 5.

The photodetectors P1 to P6 output photoelectric currents proportional to the respective amounts of light incident thereupon. These photoelectric currents are amplified by the respective amplifiers 16 and input to the switch circuit 17. The switch circuit 17 connects the photodetectors P1, P2, P5 and P6 to the tracking error detecting circuit 18 and connects the photodetectors P3 and P4 to the reading circuit 19 in response to instructions from the control circuit 20.

In this connection, it is to be noted that when the tracking portion 4 is caught, within the view fields of the respective pairs of the photodetectors P1 and P2 and the photodetectors P5 and P6, with the center of the tracking portion 4 being not deviated from the centers of the respective pairs, the light amounts received by the adjacent photodetectors of the respective pairs are large and the distributions of the brightness are substantially equal between the adjacent photodetectors. On the other hand, when the tracking portion 4 is partly caught within the view fields of the photodetectors, the light amounts received by the photodetectors are smaller and the distributions of the brightness are not equal between the adjacent photodetectors of the pairs. The tracking-error detecting circuit 18 is adapted to detect a tracking error in terms of unequalness of the brightness distribution between the adjacent photodetectors.

The unequalness of the brightness distribution may be obtained for every pair of the photodetectors P1 and P2 and the photodetectors P5 and P6, but it is obtained by the following formulae in the present embodiment:

$$\Delta 1 = (P1+P5)-(P2+P6) \ldots \quad (1)$$

$$\Delta 2 = (P1+P6)-(P2+P5) \ldots \quad (2)$$

where Pl, P2, P5 and P6 represent output signals of the respective photodetector The thus obtained difference signals $\Delta 1$ and $\Delta 2$ are transmitted to the control circuit 20. The control circuit 20 determines the magnitudes and signs of the difference signals to detect the skew and deviation, in the transverse direction, of a line connecting the track detecting spots T1 and T2 from the data/tracking line DTL together with the magnitude and direction of the skew and deviation. For example, the transversal deviation is known from $\Delta 1$ and the skew angle is known from $\Delta 2$.

Thus, not only is tracking error detected, but also an error correcting signal is output. The correction is effected by a drive mechanism (not shown).

If the tracking is normal, then the reading of the data preliminarily written is started. The reading is carried out by forming the reading/writing spot WR by the light beam B2. The reflected light of the reading/writing spot WR is provided to the photodetectors P3 and P4 and read as data by the reading circuit 19. In this case, a portion of the reflected light of the reading/writing spot WR formed by the light beam B2 is separated to be provided to the focussing detector 15 to determine whether the focussing is proper or not. The resultant deviation signal is provided to the drive mechanism (not shown) to adjust the objective lens 11 for proper focussing. The positioning and clock synchronization for the reading operation may be effected by utilizing the detection of the tracking portions 4 because the tracking portions 4 are disposed periodically at predetermined intervals.

Thus, the reading/writing spot WR is relatively moved along the data/tracking line DTL to read the data written in the data recording portions 5 between the tracking portions 4.

On the other hand, the writing of data is carried out by using the light beam B2, whose intensity is increased for data writing. In this case, a portion of the reflected light of the reading/writing spot WR formed by the light beam B2 is separated to be provided to the focussing detector 15 to determine whether the focussing is proper or not. The resultant deviation signal is provided to the drive mechanism (not shown) to adjust the objective lens 11 for effecting the focussing.

The positioning and clock synchronization for the writing operation may be effected by utilizing the detection signals of the tracking portions 4 because the tracking portions 4 are disposed periodically at predetermined intervals. For example, in the pair of the photodetectors (P1, P2), (P3, P4) or (P5, P6), the outputs of the respective photodetectors of the pair (for example, P5 and P6) are summed. The periodic changes in the sum signal ma be detected to obtain clock signals.

As described above, according to the data reading/writing system of the present embodiment, the data reading/writing can be carried out while effecting the tracking and clock synchronizing, only by tracing the data/tracking line DTL which is formed by the combination of the data track and the tracking line.

In the present embodiment, the light beam B3 is also used for providing another reading/writing spot WR for reading the data in addition to the reading/writing spot WR formed by the light beam B2. The obtained data are collated to detect a possible reading error.

More specifically, when the reading/writing spot WR is relatively moved along the data/tracking line DTL to position the track detecting spot T1 on a succeeding data recording portion 5, the reading/writing spot WR is located on the tracking portion 4 just preceding which the track detecting spot T1 has caught just before and the track detecting spot T3 is located on the data recording portion 5 just preceding which the reading/writing spot WR has caught just before. Then, the control circuit 20 provides instructions to the switch circuit 17 to disconnect the outputs of the photodetectors Pl and P2 and connect the outputs of the photodetectors P3 and P4 to the tracking-error detecting circuit 18 and connect the photodetectors P5 and P6 to the reading circuit 19. Thus, a possible error in the data reading is checked.

Also, in the present embodiment, the light beam B3 is used for the writing operation as in the reading operation as described above to read the data just written and collate it with the data to be written for checking a possible error in the writing.

Third Embodiment

Figure 7:
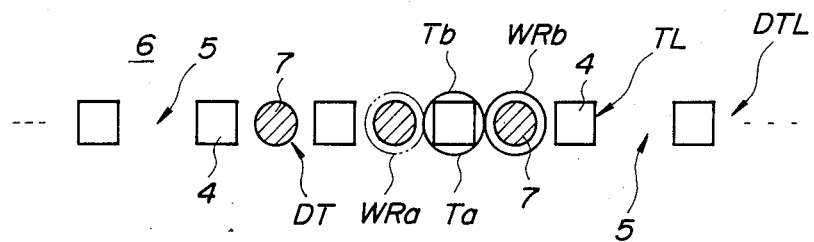
FIG. 7 is an explanatory view showing a light spot arrangement for use in a third embodiment of the present invention.

FIG. 7 illustrates a further embodiment of the present invention. According to the data reading/writing system of this embodiment, one track detecting spot T and one reading/writing spot WR are disposed along the data/tracking line DTL. These light spots T and WR are switched by a track-tracing detecting means and a reading/writing means.

This embodiment employs an optical system and an appended circuit similar to those as illustrated in FIGS. 4 to 6. However, it suffices in the present embodiment that the optical system can form two light beams and the circuit can detect the information from the two light beams. More particularly, four photodetectors P1 to P4, for example, are used for the tracking/data reading detector 14. Thus, the formation of the detector can be simplified. However, the configurations of the optical system and the appended circuit is identical in essentials with those of the optical system and circuit as illustrated in FIGS. 4 to 6 so that the description on the identical portions will be omitted here.

The switching between the light spots T and WR is carried out between mode A and mode B because two light spots are used in the present embodiment. For example, in mode A, when one of the light spots, track detecting spot Ta, is tracing the tracking portion 4, another light spot, reading/writing spot WRa reads the data in the data recording portion 5. In mode B, when said one of the light spots is the track detecting spot Tb, another reading/writing spot WRb reads the data in the data recording portion 5.

In this case, the outputs from the photodetectors Pl to P4 as illustrated in FIG. 5 are switched by the switch upon changing of the modes and selectively connected to the corresponding tracking-error detecting circuit and the reading circuit.

Since the photodetectors Pl to P4 for detecting the track detecting spot is alternately changed between mode A and mode B in the present embodiment, the detection value of the track detecting spot in the previous mode is stored and it is used in combination with a detection value of the track detecting spot in the present mode to detect a possible tracking error. For example, if the photodetectors P1 and P2 detect the track detecting spot Ta in previous mode A, then the photodetectors P3 and P4 detect the track detecting spot Tb in present mode B. In this case, the track detecting spots Ta and Tb detect double the same tracking portion 4 as shown in FIG. 7.

The tracking detection is obtained by the following formulae:

$$\Delta 3 = (P1+P3)-(P2+P4) \ldots \quad (3)$$

$$\Delta 4 = (P1+P4)-(P2+P3) \ldots \quad (4)$$

where P1 to P4 represent the output signals from the respective photodetectors.

The principle of detection of a possible tracking error from the signals $\Delta 3$ and $\Delta 4$ is similar to that in the case of $\Delta 1$ and $\Delta 2$ as described above.

Similar are the reading/writing spots WRa and WRb, and the same data recording portion 5 is detected double or twice. This embodiment utilizes this double detection for effecting double collation of the detected data to check a possible reading error.

In the present embodiment, the tracking error detection in the writing operation is carried out identically with that in the reading operation as mentioned above. With respect to the data writing operation, however, since the reading/writing spots WRa and WRb double detect the same data recording portion 5, the writing is effected either in mode A or mode B to prevent double writing. In this case, the data written is read in another mode B or A to carry out the checking of a possible error in the writing.

In the third embodiment, the positional relationship between the light spot T and the light spot WR may be fixed. In this case, problems of double reading and double writing can be avoided.

In the present embodiment, three light beams T1 to T3 may be employed as in the second embodiment and the light beams B1 and B3 may be used as the light spots T. In this case, the optical system and the circuit as used in the second embodiment may be employed without making any change in the system and circuit. The selection between the light beams B1 and B2 is carried out by selecting the outputs from the photodetectors.

Fourth Embodiment

FIGS. 8-14 illustrate a further embodiment of the present invention.

Figure 10:
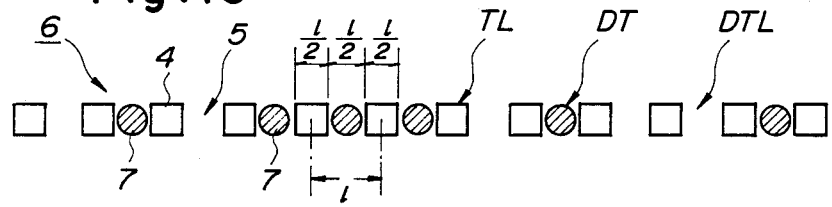
FIG. 10 is an explanatory view of one example of a data record format to which the present invention is applied.

The data reading/writing system of the present embodiment is applicable to an optical recording medium having a data recording format as illustrated in FIG. 10. The data recording format as shown in FIG. 10 includes data/tracking lines DTL each having the tracking portions 4 and the data recording portions 5 which are arranged alternately in a line in the data recording region 6 of the optical recording medium. This format is basically identical with that as shown in FIG. 1.

In the present embodiment, however, the length of the tracking portion 4 in the longitudinal direction of the tracking line TL is selected to be ½ and the distance between the centers of the adjacent tracking portions 4 is selected to be 1 as illustrated in FIG. 10. On the other hand, the length of the blank portion defined between any two adjacent tracking portions 4 is selected to be ½.

Figure 8:
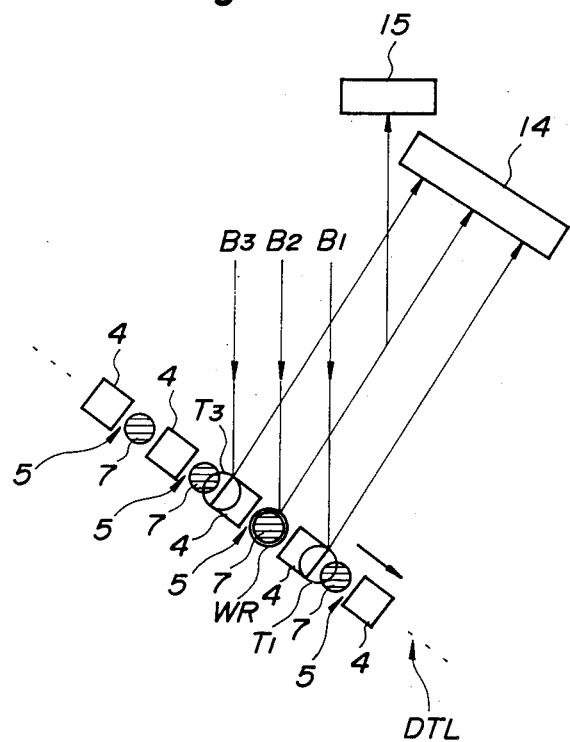
FIG. 8 is an explanatory view showing a light beam arrangement for the reading and/or writing in a fourth embodiment of the present invention.

In the data reading/writing system according to the present embodiment, three light beams B1, B2 and B3 are used as illustrated in FIG. 8. These light beams B1, B2 and B3 are formed and utilized in a manner similar to that of the second embodiment. More particularly, the light beams B1 and B3 are used mainly for the tracking and the light beam B2 is used mainly for the data reading/writing and focussing. Therefore, only the differences will be given here to avoid repetition of the description.

Figure 9:
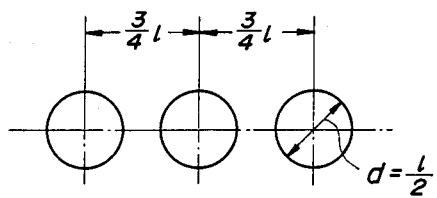
FIG. 9 is an explanatory view showing the size of and the positional relationships between light spots.

In the present embodiment, the track detecting spots T1 and T3 have a diameter (d=½) which is as large as it is inscribed in the tracking portion 4 to be detected as illustrated in FIG. 9. The reading/writing spot WR is formed as large as the track detecting spots T1 and T3 and may be formed different from the track detecting spots, depending upon the diameter of the optically changed state 7 to be formed in the data recording portion 5. Of course, the reading/writing spot WR may alternatively be formed larger than the track detecting spots T1 and T3. The track detecting spots T1 and T3 are disposed so that the centers of the spots T1 and T3 may be 3 1/4 from the center of the reading/writing spot WR.

Figure 11:
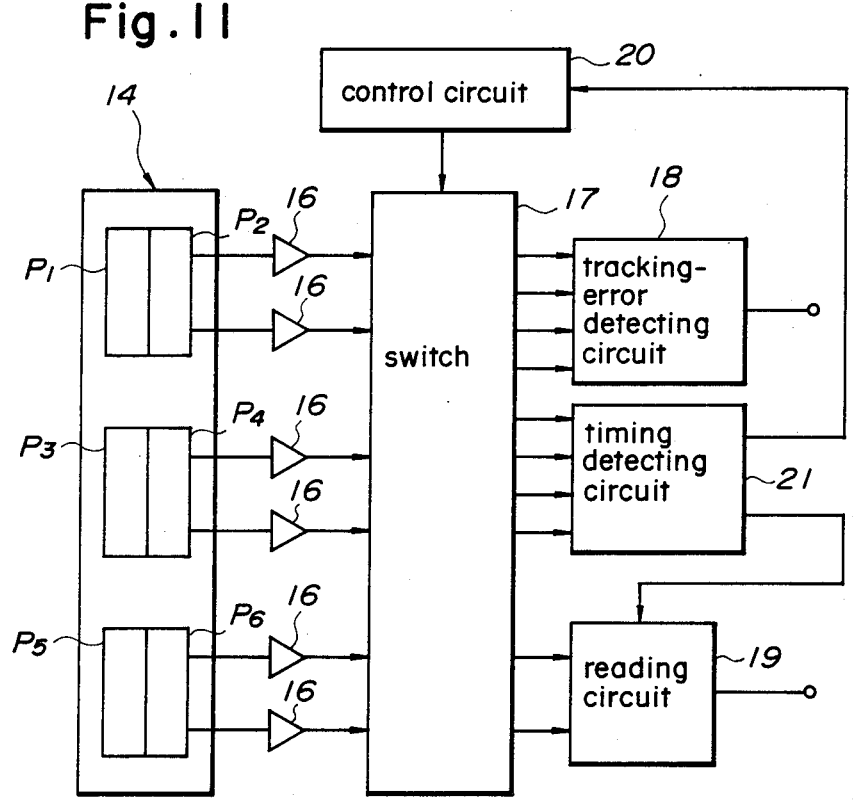
FIG. 11 is a block diagram of an appended diagram for use in the fourth embodiment.

The formation of the light beams B1, B2 and B3 and the detection of the reflected light from the optical recording medium are carried out by the optical system as illustrated in FIG. 4 and by the circuit as illustrated in FIG. 11.

This optical system is identical with that as used in the second embodiment. The circuit associated with the optical system comprises, as illustrated in FIG. 11, amplifiers 16, a switch circuit 17, a tracking-error detecting circuit 18, a reading circuit 19, a control circuit 20 and a timing detecting circuit 21. These elements are identical with those of the second embodiment except for the timing detecting circuit 21. Only the difference will be described here.

Pairs of the photodetectors P1 to P6 are disposed so that the track detecting spots T1 and T3 and the reading/writing spot WR are caught within the effective photodetecting areas of the respective pairs and have effective photodetecting areas large enough to form images of the spots therein.

Although a pair of the photodetectors P3 and P4 is used for the reading in the present embodiment because a PIN photodiode array having three pairs of photodetectors is used as the tracking/reading detector, one photodetector will suffice for the reading in this invention.

Outputs from the photodetectors P1 and P6 are connected in pairs to the switch circuit 17 through the respective amplifiers 16 as illustrated in FIG. 11. The switch circuit 17 is connected, on the output side thereof, to the tracking-error detecting circuit 18 and the reading circuit 19. In response to an instruction signal from the control circuit 20, the outputs of the respective pairs of the photodetectors P1 to P6 are connected to the tracking-error detecting circuit 18, the reading circuit 19 and the timing detecting circuit 21.

The timing detecting circuit 21 includes a comparator circuit (not shown) for comparing the photoelectric output of the pair of the photodetectors P1 and P2 to the photoelectric output of the pair of the photodetectors P5 and P6 to determine whether the reading/writing spot WR is at a reading or writing position or not. In the present embodiment, it is also determined whether the track detecting spot T3 is on the reading position or not.

The optical system has a similar configuration to that of the second embodiment and it is used in common for both the reading and writing operation.

Figure 13:
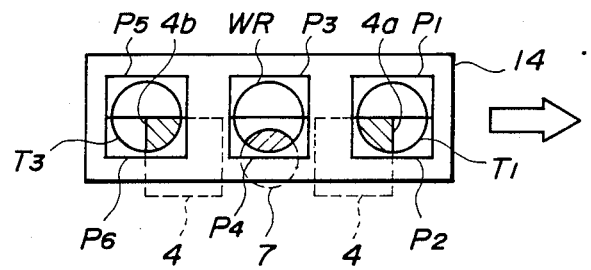
Figure 14:
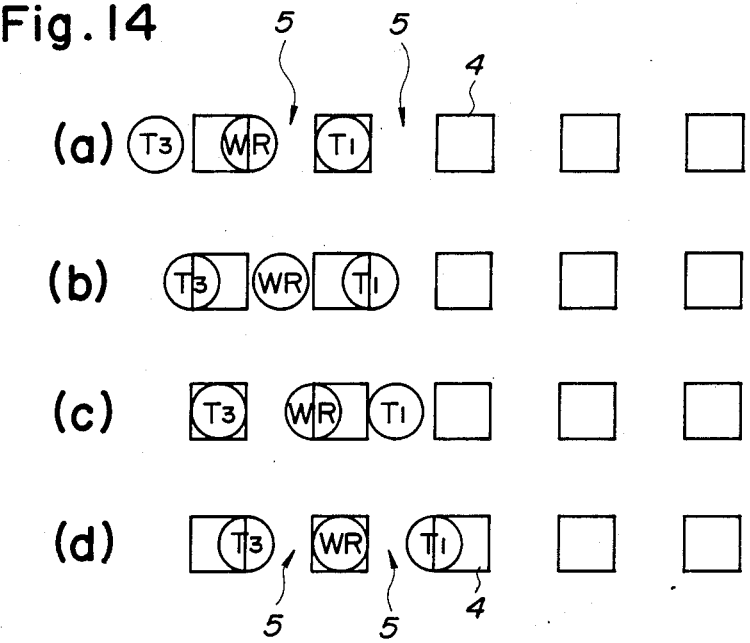
FIG. 14 (a) to (d) is an explanatory view showing the relationship between the tracking portions and the light spots.
Figure 15:
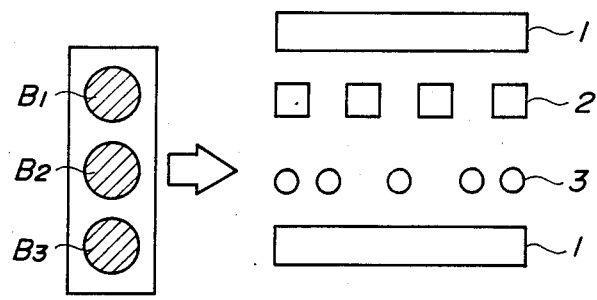
FIG. 15 is a schematic view showing a conventional data recording format.

The operation of the present embodiment will now be described with reference to the data reading operation, referring to FIG. 12 to 14 (a) to (d). However, it is to be noted that the tracking operation itself is identical in the reading operation.

In the optical system, light from the light source, laser diode 8, is split to three beams through the collimating lens 9 and the grating 10 and the resulting three beams are irradiated onto the optical recording medium C through the beam splitter 12 and the objective lens 11, respectively. The light reflected from the optical recording medium C returns to the beam splitter 12 through the objective lens 11 and is emitted externally.

The emitted light is partly reflected by the beam splitter 13 and is incident upon the focussing detector 15, but most of the emitted light enters the tracking-/data reading detector 14. At this time, the three light beams provide the track detecting spots T1 and T3 and the reading/writing spot WR and form images of the irradiated portions on the tracking/data reading detector 14 as illustrated in FIG. 12.

The photodetectors P1 to P6 output photoelectric currents proportional to the respective amounts of light incident thereupon. These photoelectric currents are amplified by the respective amplifiers 16 and input to the switch circuit 17. The switch circuit 17 connects the outputs of the photodetectors P1, P2, P5 and P6 to the tracking-error detecting circuit 18 and connects the outputs of the photodetectors P3 and P4 to the reading circuit 19 in response to instructions from the control circuit 20.

Figure 12:
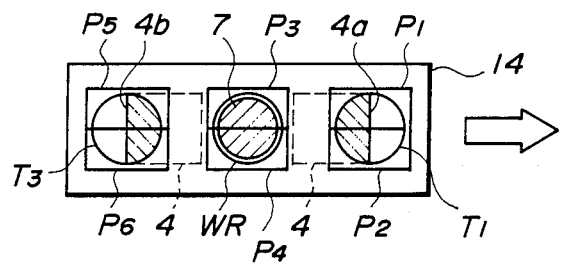
FIGS. 12 and 13 are each explanatory views showing the relationship between light spots and photodetectors.

In this connection, it is to be noted that when the tracking portion 4 is caught, within the view fields of the respective pairs of the photodetectors P1 and P2 and the photodetectors P5 and P6, with the center of the tracking portion 4 being not deviated from the centers of the respective pairs, the distributions of the brightness are substantially equal between the adjacent photodetectors as illustrated in FIG. 12. On the other hand, when the tracking portion 4 is partly caught within the view fields of the photodetectors, the distributions of the brightness are not equal between the adjacent photodetectors of the pairs as illustrated in FIG. 13. The tracking-error detecting circuit 18 is adapted to detect a tracking error in terms of unequalness of the brightness distribution between the adjacent photodetectors.

The unequalness of the brightness distribution may be obtained for every pair of the photodetectors P1 and P2 and the photodetectors P5 and P6, but it is obtained by the following formula in the present embodiment:

$$\Delta = (P1+P5)-(P2 30 P6) \ldots \quad (5)$$

where P1, P2, P5 and P6 represent output signals of the respective photodetectors.

The thus obtained difference signal $\Delta$ is transmitted to the control circuit 20. The control circuit 20 determines the magnitudes and signs of the difference signals to detect the deviation, in the transverse direction, of a line connecting the track detecting spots T1 and T2 from the data/tracking line DTL.

Since the track detecting spots T1 and T3 are relatively moved as illustrated in FIGS. 14(a) to (d), the tracking error in the transverse direction can always be checked as apparent from the formula (5).

Thus, not only is tracking error is detected, but also an error correcting signal is output. The correction is effected by a drive mechanism (not shown).

If the tracking is normal, then the reading of the data preliminarily written is started. The reading is carried out in synchronism with a timing signal from the timing detecting circuit 21.

The timing detecting circuit 21 compares the photoelectric output from the pair of the photodetectors P1 and P2 to the photoelectric output from the pair of the photodetectors P5 and P6 to determine whether the reading/writing spot WR is on the reading or writing position or not. In the present embodiment, it is also determined whether the track detecting spot T3 is on the reading position or not.

Since the reading/writing spot WR and the track detecting spots T1 and T3 are relatively moved as shown in FIGS. 14(a) to (d), the photoelectric outputs from the respective pairs of the photodetectors will change as follows:

(a) $(P1+P2) > (P5+P6)$ (b) $(P1+P2) = (P5+P6)$ (c) $(P1+P2) < (P5+P6)$ (d) $(P1+P2) = (P5+P6)$

As illustrated in FIG. 12, when there is a relation of (b), the data reading is possible. Under these conditions, a leading edge 4a of the tracking portion 4 is located centrally in the photodetectors P1 and P2 and a trailing edge 4b is located centrally in the photodetectors P5 and P6. These positional relations are suitable for the reading by the reading/writing spot WR, ensuring the data reading operation.

The timing detecting circuit 21 monitors the changes of FIGS. 14(a) to (d) and transmits a reading timing signal to the reading circuit 19 when there is a relation of (b).

In order to check the reading by the track detecting spot T3, the condition (a) is used for the reading. Therefore, the timing detecting circuit 21 not only transmits the reading timing signal to the reading circuit 19, but also transmits a switching signal for the switch circuit 17 to the control circuit 20. The control circuit 20 connects the output of the pair of the photodetectors P5 and P6 to the reading circuit 19 in response to the switching signal. Thus, the data can be read by these photodetectors.

This data is collated with the data which has been read just before to check a possible error in the reading.

The reading operation is carried out by forming the reading/writing spot WR by the light beam B2. The reflected light of the reading/writing spot WR is provided to the photodetectors P3 and P4 and read as data by the reading circuit 19. In this case, a portion of the reflected light of the reading/writing spot WR formed by the light beam B2 is separated to be provided to the focussing detector 15 to determine whether the focussing is proper or not. The resultant deviation signal is provided to the drive mechanism to adjust the objective lens 11 (FIG. 4) for effecting the focussing.

Thus, the reading/writing spot WR is relatively moved along the data/tracking line DTL to read the data written in the data recording portions 5 between the tracking portions 4.

On the other hand, the writing of data is carried out by using the light beam B2, whose intensity is increased for the data writing. In this case, a portion of the reflected light of the reading/writing spot WR formed by the light beam B2 is separated to be provided to the focussing detector 15 to determine whether the focussing is proper or not. The resultant deviation signal is provided to the drive mechanism to adjust the objective lens 11 for effecting the focussing. The timing of the writing operation is identical with that of the reading operation as described above.

As described above, according to the data reading/writing system of the present embodiment, the data reading/writing can be carried out while effecting the tracking and detecting the timing for the reading/writing operation, only by tracing the data/tracking line DTL which is formed by the combination of the data track and the tracking line. Therefore, there is no need to consider the relationship with the adjacent lines for the reading/writing operation.

According to the present embodiment, the series of light spots are so formed that they have specific positional relationship therebetween with predetermined intervals therebetween which allows the whole or part of any of the light spots may be on the tracking portion. Therefore, the tracking portions formed periodically but intermittently can be utilized substantially as a continuous line. Thus, there is no fear of losing track at the discontinued portions of the line.

In the present embodiment, the light beam B3 is also used for providing another reading/writing spot WR for reading the data in addition to the reading/writing spot WR formed by the light beam B2. The obtained data are collated to detect a possible reading error.

Also, in the present embodiment, the light beam B3 is used for the writing operation as in the reading operation as described above to read the data just written and collate it with the data to be written for checking a possible error in the writing.

Although the timing is detected by the comparison between the pairs of the photodetectors (P1, P2) and (P5, P6) in the present embodiment, the outputs from the photodetectors of each pair may be used for detection of the timing as in the foregoing embodiment.

Fifth Embodiment

Figure 16:
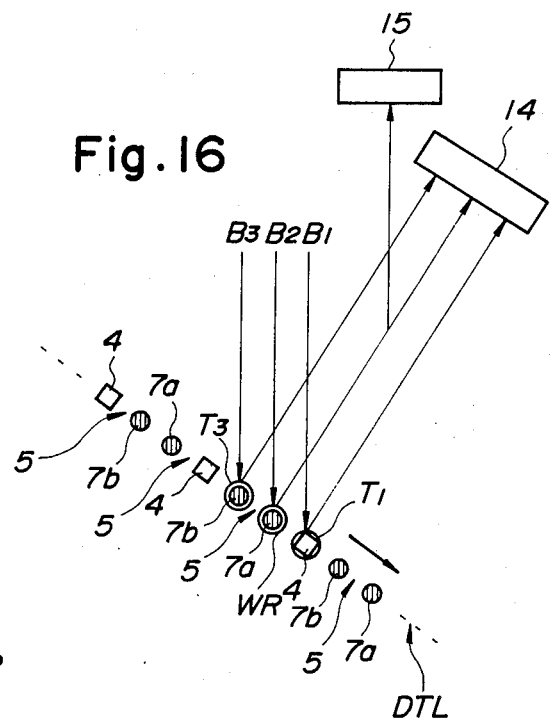
FIG. 16 is an explanatory view showing a light beam arrangement for the reading/writing for use in a fifth embodiment of the present invention.

FIG. 16 illustrates a further embodiment of the present invention.

According to the data reading/writing system for the optical recording medium of the present invention, the tracking portions 4 and the data recording portions 5 are arranged alternatingly in the same line in the data recording region 6 of the optical recording medium to form the data/tracking line DTL. Each of the data recording portions 5 has a space for storing two optically changed states 7a and 7b. This embodiment is substantially the same as the foregoing embodiments except for the data recording portion 5 capability of forming two optically change states therein. Only the difference will be described here.

In the present embodiment, an optical system and a circuit similar to those as illustrated in FIGS. 4 to 6 may be employed for the reading or writing of the data. In this embodiment, however, the optical system and the circuit are so adapted that the reading/writing beam B2 may select either of the two optically changed states 7a and 7b to effect the reading or writing of the data. This can be effected in various ways and one example of the implementation is shown in FIG. 16.

According to the implementation as illustrated in FIG. 16, the tracking light beams B1 and B3 and the reading/writing light beam B2 are so formed that when one of the light spots by the tracking light beams B1 and B2 (T1 in FIG. 16) is on the tracking portion 4, the light spot WR by the reading/writing light beam B2 is positioned on one of the optically changed states 7a and 7b (7a in FIG. 16). When the light spot T3 by the other tracking light beam B3 is on the tracking portion 4, the light spot WR by the reading/writing light beam B2 is on the other optically changed state 7b. In the circuit associated with the optical system, the light spot T1 or T3 is selected to select the optically changed state 7a or 7b as one-bit data to be read or written by the light beam B2.

Although two optically changed states 7a and 7b are provided in the present embodiment, three or more optically changed states ma be provided if desired.

Modification of Embodiments

Although the foregoing embodiments are applied to the system having both the reading function and the writing function, it may also applied to the system solely for the reading or the writing. In this case, the function which is not used may be omitted. In the case of writing, it is preferred that the system have the reading function as well, to effect monitoring of the writing.

In the foregoing embodiments, a plurality of light beams are obtained from a single light source, but a plurality of light sources may alternatively be employed for obtaining plural light beams.

We claim:

1. An optical recording medium containing a data record formatting arrangement adapted to carry out data reading and/or writing along tracking lines, said data record formatting arrangement comprising:
    tracking portions used as a reference for the reading and/or writing operation; and
    data recording portions for storing data;
    said tracking portions and said data recording portions being alternately arranged along the same line in a data recording region of the optical recording medium and wherein each of said tracking in the same line is formed square and has a length along one side of the tracking portion which is ½ the pitch or distance between any two adjacent tracking portions.

2. A data reading/writing system for an optical recording medium having tracking portions used a reference for the reading and/or writing operation and data recording portions for storing data; said tracking portions and said data recording portions being alternately arranged along the same line in a data recording region of the optical recording medium, which system comprises:
    track-tracing detecting means for applying a light spot or spots on the optical recording medium to trace the tracking portions;
    reading/writing means for applying a light spot on the optical recording medium to read and/or write the data;
    the track-tracing detecting means and the reading/writing means being arranged so that the light spots applied onto the optical recording medium are disposed on and along said same line in which the tracking portions and the data recording portions are alternately arranged.

3. A data recording/writing system for an optical recording medium as claimed in claim 2, wherein said light spots are spaced with specific positional relationships therebetween so that the whole or part of any one of the light spots may be positioned on the tracking portions during tracking.

4. A data recording/writing system for an optical recording medium as claimed in claim 3, wherein said reading/writing means is used both for the reading and the writing.

5. A data recording/writing system for an optical recording medium as claimed in claim 3, wherein three light spots in total are applied to the optical recording medium two of said light spots being used primarily for the tracking and the central light spot therebetween being used primarily for data reading and/or writing.

6. A data recording/writing system for an optical recording medium as claimed in claim 5, including control circuit means for enabling one of the two light spots used for tracking to also be used as a monitoring light spot for reading error check and/or writing error check.

7. A data recording/writing system for an optical recording medium as claimed in claim 2, wherein three light spots in total are applied to the optical recording medium, two of said light spots being used primarily for tracking and the central light spot therebetween being used primarily for data reading and/or writing.

8. A data recording/writing system for an optical recording medium as claimed in claim 7, including control circuit means for enabling one of the two light spots used for tracking to also be used as a monitoring light spot for reading error check and/or writing error check.

9. A data recording/writing system for an optical recording medium as claimed in claim 2, wherein said reading/writing means is used only for reading.

10. A data recording/writing system for an optical recording medium as claimed in claim 2, wherein said reading/writing means is used both for the reading and the writing.

11. A data recording/writing system for an optical recording medium as claimed in claim 2, including control circuit means for obtaining a clock signal from optical information provided by one of the light spots.

12. The data recording/writing system of claim 2, wherein said track-tracing detecting means is arranged to scan only said light spots for tracing the tracking portions within said same line.

* * * * *